(12) United States Patent
Clemente

(10) Patent No.: US 11,174,677 B2
(45) Date of Patent: Nov. 16, 2021

(54) VEHICLE-MOUNTED ELEVATED ACCESS SYSTEM

(71) Applicant: Joshua Clemente, Philadelphia, PA (US)

(72) Inventor: Joshua Clemente, Philadelphia, PA (US)

(*) Notice: Subject to any disclaimer, the term of this patent is extended or adjusted under 35 U.S.C. 154(b) by 100 days.

(21) Appl. No.: 16/688,884

(22) Filed: Nov. 19, 2019

(65) Prior Publication Data

US 2020/0157884 A1 May 21, 2020

Related U.S. Application Data

(60) Provisional application No. 62/770,022, filed on Nov. 20, 2018.

(51) Int. Cl.
| | |
|---|---|
| *E06C 5/04* | (2006.01) |
| *B64F 1/315* | (2006.01) |
| *E06C 5/36* | (2006.01) |
| *E06C 5/44* | (2006.01) |
| *E06C 7/16* | (2006.01) |
| *E06C 1/39* | (2006.01) |
| *E06C 7/18* | (2006.01) |

(52) U.S. Cl.
CPC ............... *E06C 5/04* (2013.01); *B64F 1/315* (2013.01); *E06C 1/39* (2013.01); *E06C 5/36* (2013.01); *E06C 5/44* (2013.01); *E06C 7/16* (2013.01); *E06C 7/183* (2013.01)

(58) Field of Classification Search
CPC ... B64F 1/315; E06C 5/04; E06C 1/39; E06C 5/36; E06C 5/44; E06C 7/16; E06C 7/183
See application file for complete search history.

(56) References Cited

U.S. PATENT DOCUMENTS

| 502,484 | A | * | 8/1893 | Dederick | |
|---|---|---|---|---|---|
| 1,162,413 | A | * | 11/1915 | Sperling | ............... E06C 5/04 |
| | | | | | 182/68.1 |
| 3,605,943 | A | * | 9/1971 | Beaudet | ............... E06C 5/04 |
| | | | | | 182/66.2 |
| 6,832,667 | B1 | | 12/2004 | Kahre et al. | |
| 8,622,173 | B2 | | 1/2014 | Fuqua et al. | |

(Continued)

FOREIGN PATENT DOCUMENTS

| DE | 9116020 U1 * | 4/1993 | ............ B64F 1/315 |
|---|---|---|---|
| DE | 4400741 A1 * | 7/1995 | ............ B64F 1/315 |
| WO | WO 01/97919 A1 | 12/2001 | |

*Primary Examiner* — Alvin C Chin-Shue
(74) *Attorney, Agent, or Firm* — Lewis Roca Rothgerber Christie LLP

(57) ABSTRACT

A vehicle-mounted access system includes a fixed base structure including a plurality of track channels; a plurality of movable hinge carriages configured to move along the plurality of track channels; an inclinable access structure pivotably connected to the movable hinge points and connected to lifting masts by forward tension elements, lifting masts connected to the fixed base structure by rear tension elements and pivotably connected to the fixed base structure; an actuator connected between the movable hinge carriages and the fixed base structure, the actuator configured to move the movable hinge carriages to raise the distal end of the inclinable access structure via the forward tension elements, the lifting mast, and the rear tension elements.

17 Claims, 10 Drawing Sheets

(56) References Cited

U.S. PATENT DOCUMENTS

| 8,631,905 B2* | 1/2014 | Parrish | E06C 7/183 |
| | | | 182/127 |
| 8,813,911 B2* | 8/2014 | Fuqua | B66F 11/044 |
| | | | 182/69.6 |

* cited by examiner

VEHICLE-MOUNTED ELEVATED ACCESS SYSTEM

CROSS-REFERENCE TO RELATED APPLICATION

The present application claims priority to and the benefit of U.S. Provisional Patent Application No. 62/770,022, filed on Nov. 20, 2018, the content of which is incorporated herein by reference in its entirety.

BACKGROUND

1. Field

Aspects and features of embodiments of the present invention relate to a vehicle-mounted elevated access system.

2. Description of Related Art

In the course of, for example, tactical (police, SWAT, or military), firefighting, and rescue operations, groups of people may need to rapidly enter and/or exit elevated points of interest, including buildings, structures, environmental features, or mobile targets (e.g., commercial aircraft parked on tarmac). To easily and quickly reach these elevated points of interest, external structures, such as external staircases, may be used. Further, in some instances, it may be desired that a continuous route of access and/or egress between the ground and the elevated point of interest be maintained such that rapid movements of personnel between elevations may be achieved at any time throughout the operation.

Conventional elevated access systems exist which may be mounted or dismounted from various suitable vehicles in order that the vehicle may be used in a variety of functions (e.g., so that the vehicle's utility is not limited). When mounted to a suitable vehicle, such systems generally include a base structure connected to the vehicle at a plurality of points and an access structure including a ramp or stairway, which can be inclined with respect to the base structure, providing personnel access between ground level and points some height above the ground.

However, these conventional elevated access systems suffer drawbacks including:
- a reduction in horizontal overhang of the access structure;
- substantial cantilevered sections of the access structure that are subject to increased bending forces and deflections (e.g., movement under load) as compared to non-cantilevered structures; and
- inherent instability and failure modes such as buckling.

The above information disclosed in this Background section is only for enhancement of understanding of the background, and therefore, it may contain information that does not constitute prior art.

SUMMARY

Embodiments of the present invention provide an elevated access system including:
- a movable hinge between an access structure and a base structure, which improves horizontal reach;
- self-deploying and self-stowing handrails/guardrails along the access structure and end platform;
- a self-deploying and self-stowing end platform; and
- access structure actuation components that are substantially loaded in tension and that are attached further along the access structure, thereby reducing cantilevered lengths of the access structure.

Aspects of embodiments of the present disclosure are directed toward a vehicle-mounted elevated access system.

According to some example embodiments of the present disclosure, a vehicle-mounted access system including: a fixed base structure including a plurality of track channels; a plurality of movable hinge carriages respectively on and configured to move along the plurality of track channels; an inclinable access structure having a proximal end and a distal end, the proximal end of the inclinable access structure being pivotably connected to the plurality of movable hinge carriages; a lifting mast having a proximal end and a distal end, the distal end of the lifting mast being connected to the distal end of the inclinable access structure by forward tension elements and being connected to the fixed base structure by rear tension elements, the proximal end of the lifting mast being pivotably connected to the fixed base structure; and an actuator connected between the movable hinge carriages and the fixed base structure, the actuator being configured to move the movable hinge carriages to raise the distal end of the inclinable access structure via the forward tension elements, the lifting mast, and the rear tension elements.

According to some example embodiments, the vehicle-mounted access system further includes an inclinable access handrail positioned along to and pivotably attached to the inclinable access structure.

According to some example embodiments, the inclinable access handrail is configured to extend into a deployed position by a plurality of linkages.

According to some example embodiments, the vehicle-mounted access system further including a multi-position end breaching platform that is pivotably connected to the distal end of the inclinable access structure.

According to some example embodiments, the vehicle-mounted access, further including a platform handrail positioned along and pivotably attached to the multi-position end breaching platform.

According to some example embodiments, the platform handrail is configured to extend into a deployed position by an action of a multilink kinematic mechanism.

According to some example embodiments, the vehicle-mounted access system further including a plurality of secondary actuators connected between the distal end of the inclinable access structure and the multi-position end breaching platform.

According to some example embodiments, the secondary actuators are configured to extend to pivot the multi-position end breaching platform relative to the inclined access structure and to transition a surface of the multi-position end breaching platform into a series of stairs.

According to some example embodiments, the inclinable access structure further includes a ramp.

According to some example embodiments, the inclinable access structure further includes a plurality of stairs.

According to some example embodiments, the plurality of stairs are configured to remain passively parallel to the ground.

According to some example embodiment, the vehicle-mounted access system further including a controller configured to control movement of the actuator.

According to some example embodiments, the controller is operated by a touchscreen user interface including: a manual mode; a preset mode; a video streaming mode; and an aircraft mode.

According to some example embodiments, the preset mode is configured to allow a selection of pre-programmed heights of the distal end of the inclinable access structure.

According to some example embodiments, in the aircraft mode, the touchscreen user interface displays an aircraft, wherein, in the aircraft mode, the controller is configured to allow for a selection of a pre-programmed height of the distal end of the inclinable access structure by selecting a window on the displayed aircraft.

According to some example embodiments, the actuator is configured to pull the movable hinge carriages toward the actuator to raise the distal end of the inclinable access structure.

According to some example embodiments, a method for deploying the vehicle-mounted access system by using a touchscreen user interface, the method including: displaying, by the touchscreen user interface, an image of an aircraft; transmitting, by the touchscreen user interface, a preprogrammed height selected by a user by selecting a window on the image of the aircraft to a controller of the vehicle-mounted access system; and raising, by the controller, a distal end of an inclinable access structure connected to the vehicle-mounted access system to the preprogrammed height.

DETAILED DESCRIPTION

The exemplary embodiments of the present invention disclosed herein are directed to a vehicle-mounted platform including one or more inclinable access structures connected to a base structure at movable hinge points, which allows the entire access structure to advance toward an above-ground target prior to and/or during elevation/inclination. In some embodiments, the actuation devices, structures, and mechanisms of the access structure are substantially loaded in tension, and the handrails/guardrails and end platform(s) may be deployed automatically and without manual effort.

Figure 1:
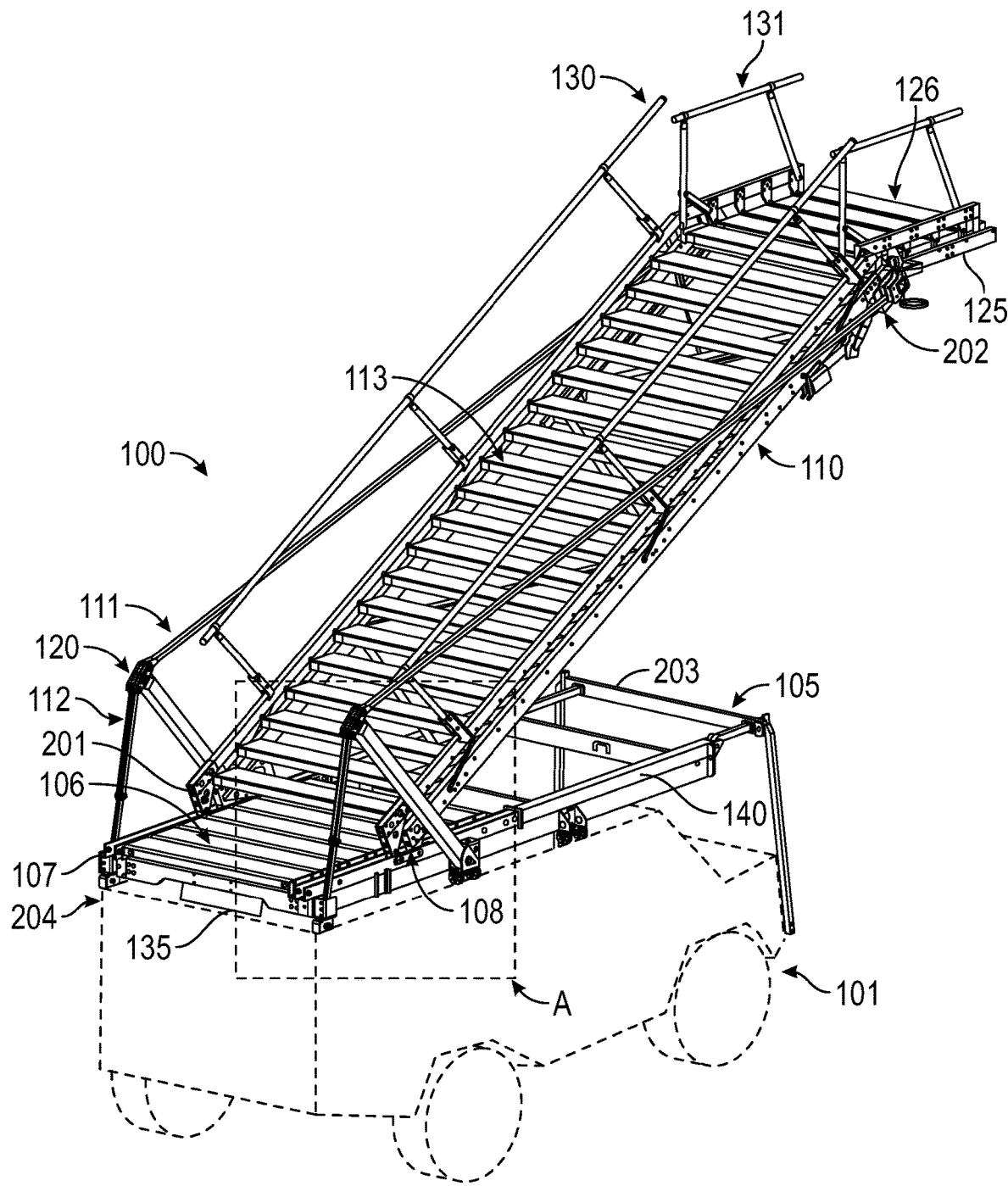
FIG. 1 is a perspective view of a vehicle-mounted elevated access system according to an embodiment of the present invention.
Figure 2:
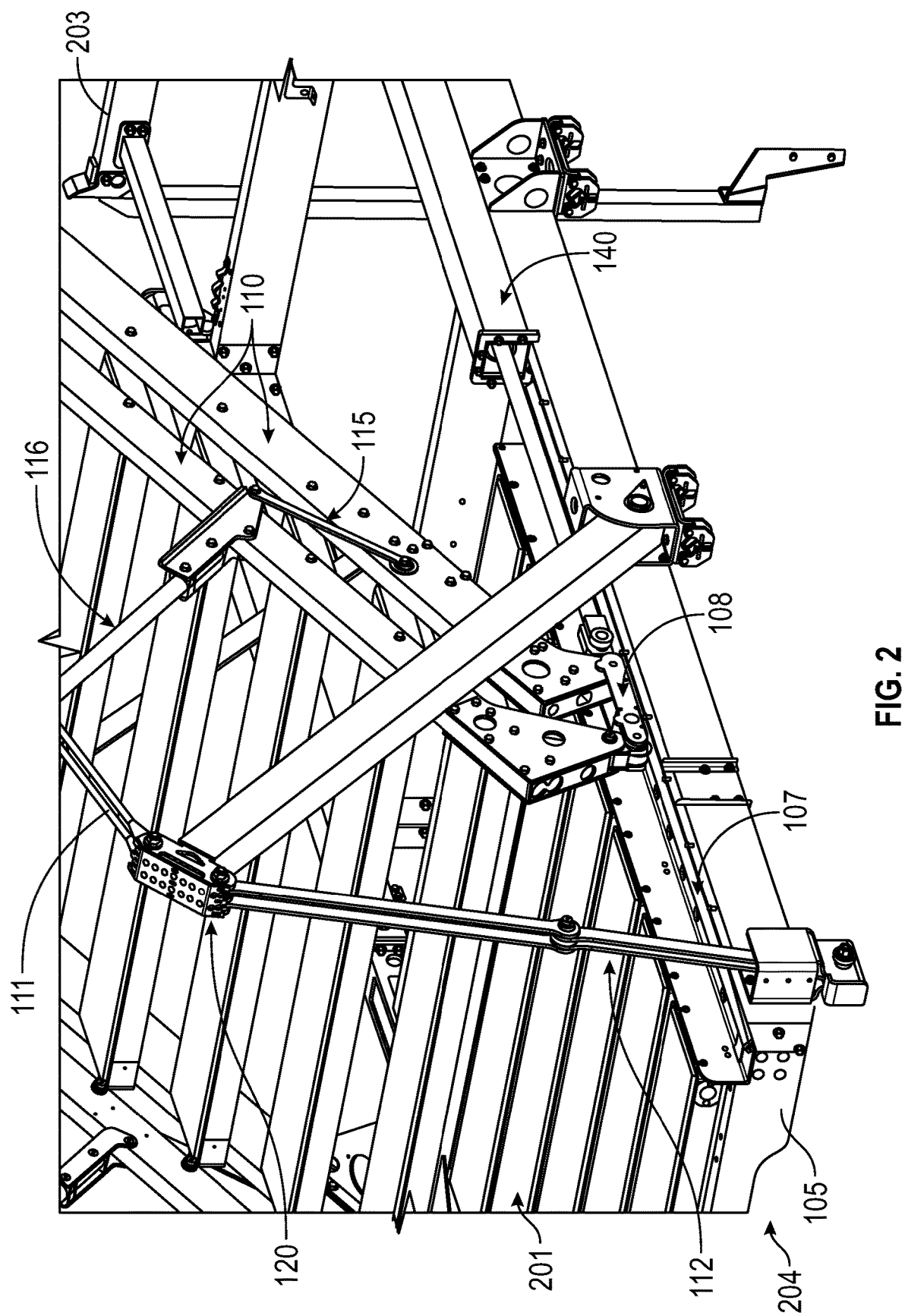
FIG. 2 shows an enlarged portion A of FIG. 1.
Figure 3:
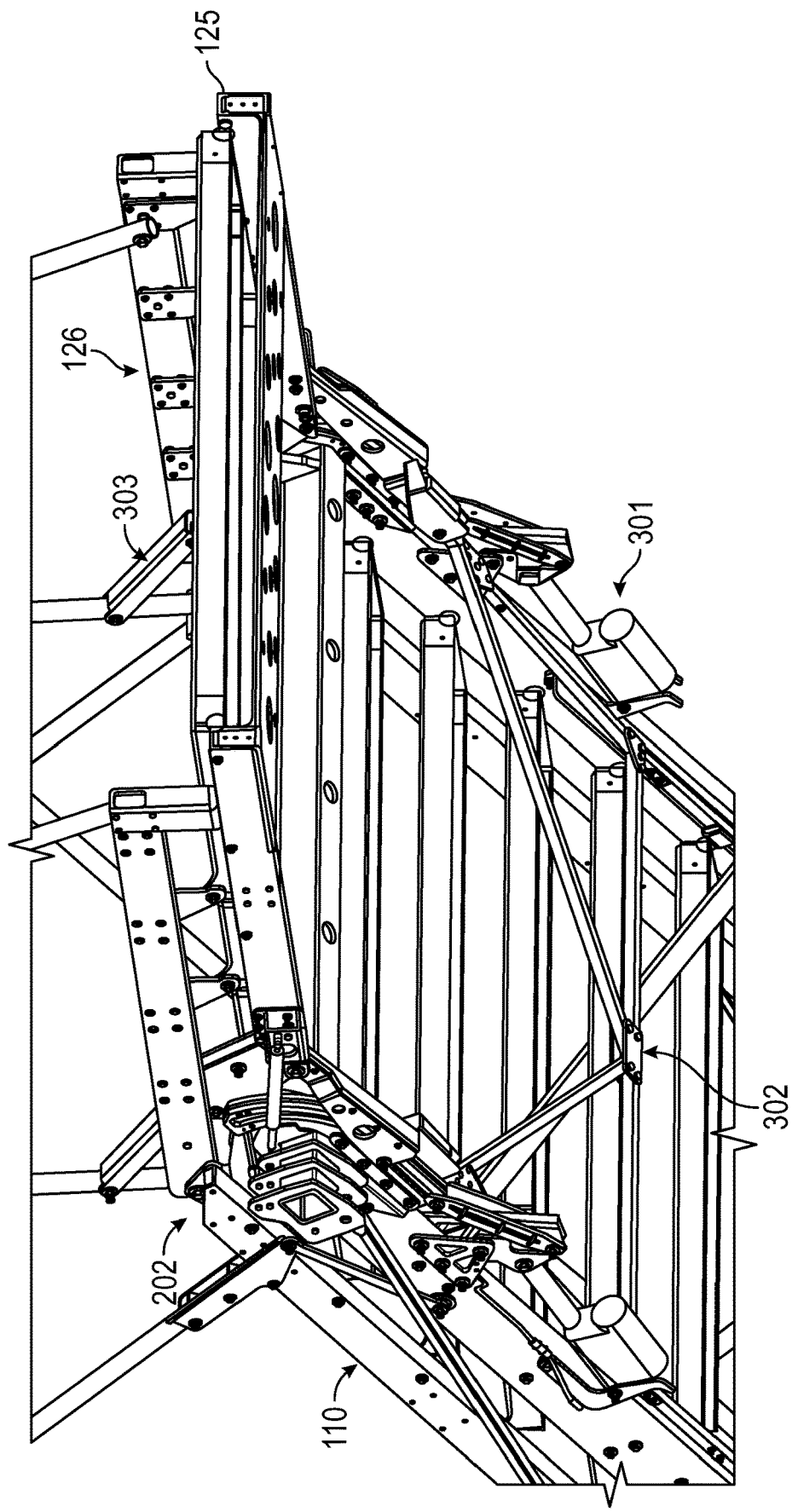
FIG. 3 is a perspective view of an end platform shown in FIG. 1 in a deployed configuration.

Referring to FIGS. 1-3, a vehicle-mounted elevated access system 100 according to an embodiment of the present invention includes an inclinable access structure 110 connected to (e.g., positioned upon) a fixed base structure (e.g., a fixed base) 105. In some embodiments, a plurality of inclinable access structures 110 may be included in the vehicle-mounted elevated access system 100. In such embodiments, the inclinable access structures 110 may be arranged adjacent to each other or in front/behind each other. The fixed base structure 105 may be mounted to a suitable host vehicle 101 so the vehicle-mounted elevated access system 100 is mobile. In such an embodiment, the fixed base structure 105 has a front end 203 that is positioned near the front of the host vehicle 101 and a rear end 204 opposite to the front end 203 and positioned near the rear of the host vehicle 101.

The inclinable access structure 110 has a proximal end 201 that is partially connected (e.g., movably and/or pivotably connected to, not rigidly connected) to the fixed base structure 105 and a distal end 202 opposite to the proximal end 201. In a deployed configuration, the distal end 202 is positioned further away from the fixed base structure 105 than is the proximal end 201.

In various embodiments, the inclinable access structure 110 may include one or more ramps and/or one or more stairways. In the illustrated embodiment, the inclinable access structure 110 includes a stairway including a plurality of steps 113. The steps 113 may be configured to remain passively parallel to the ground (e.g., may remain parallel to the ground due to gravity) during all angles of operation of the inclinable access structure 110 (e.g., during inclination and declination of the inclinable access structure 110).

Hereinafter, the lifting mechanism for the inclinable access structure 110 will be described in more detail. A plurality of lifting masts 120 (e.g., one lifting mast 120 on each side of the inclinable access structure 110, or one lifting mast 120 on each side of each of the inclinable access structures 110) are pivotably connected to the fixed base structure 105 at a proximal end of the lifting masts 120. A distal end of each of the lifting masts 120 is connected to (e.g., pivotably connected to) forward tension element(s) 111 and rear tension element(s) 112. The forward tension elements 111 are respectively connected to (e.g., extend between) the distal end of the lifting masts 120 and the distal end 202 of the inclinable access structure 110, and the rear tension elements 112 are respectively connected to (e.g., extend between) the distal end of the lifting masts 120 and the fixed base structure 105.

The forward and rear tension elements 111/112 may be rods, or plates, such as metal or composite rods or plates, or they may be cables or ropes, such as metal cable or synthetic fiber rope or cable. In other embodiments, the forward and rear tension elements 111/112 may be cables or ropes, such as metal cables or synthetic fiber ropes or cables. In some embodiments, the forward tension elements 111 may each be a single, continuous element between the lifting mast 120 and the distal end 202 of the inclinable access structure 110, and the rear tension elements 112 may each include a plurality of elements pivotably connected to each other. Referring to, for example, FIG. 4, by adding a pivotable joint (e.g., a pivotable connection) in the rear tension element 112, the rear tension element 112 may be more compactly folded in a retracted/declined position.

In addition, the fixed base structure 105 includes a plurality of track channels 107 (e.g., one track channel 107 on each side of the inclinable access structure 110). The track channels 107 are oriented from the front end 203 to the rear end 204 of the fixed base structure 105 (e.g., an axis of each of the track channel 107 extends in a direction from the front end 203 toward the rear end 204 of the fixed base structure 105).

One or more movable hinge points (e.g., moveable hinge carriages) 108 may be arranged on each track channel 107. The movable hinge points 108 may include a plurality of bearings (e.g., wheels or sliding/bearing surfaces and plates) such that they may move longitudinally along the respective track channel 107.

The inclinable access structure 110 may be pivotably attached to the movable hinge points 108, which are arranged on the track channels 107. For example, a proximal end 201 of the inclinable access structure 110 may be connected to one movable hinge point 108.

Actuators 140 may be connected between the movable hinge points 108 and the front end 203 of the fixed base structure 105. In various embodiments, the actuators 140 may be hydraulic cylinders (e.g., double-acting hydraulic cylinders), and in such an embodiment, the barrel is connected to the front end 203 of the fixed base structure 105 and the piston rod is connected to the movable hinge points 108, but the present invention is not limited thereto. In other embodiments, the actuators 140 may be screw-type actuators, such as ACME or ball screw actuators, or a belt drive, rack and pinion, gear and track, or a set of winches, but the present invention is not limited thereto. The actuators 140 may be configured to translate (e.g., move or pull) the movable hinge points 108 along the track channels 107 toward the front end 203 of the fixed base structure 105, thereby moving the proximal end 201 of the inclinable access structure 110. As the proximal end 201 of the inclinable access structure 110 moves toward the front end 203 of the fixed base structure 105, the distal end 202 of the inclinable access structure 110 is elevated (e.g., pivoted upwardly) about the lifting masts 120 due to the fixed lengths of the front and rear tension elements 111/112. For example, because the front and rear tension elements 111/112 do not extend (e.g., stretch), as the proximal end 201 of the inclinable access structure 110 moves forward due to the movement of the movable hinge points 108, the distal end 202 of the inclinable access structure 110 is pulled upwardly (e.g., is inclined) due to the restrictive force applied by the front and rear tension elements 111/112. Put another way, because the length of the front and rear tension elements 111/112 cannot extend beyond a maximum length, as the proximal end 201 of the inclinable access structure 110 moves toward the front end 203 of the fixed base structure 105, the distal end 202 of the inclinable access structure 110 moves upwardly (e.g., inclines). Reversing the actuators 140 translates (e.g., moves or pushes) the movable hinge points 108 rearward (e.g., toward a rear of the vehicle 101), thereby declining the inclinable access structure 110 and stowing the inclinable access structure 110.

In some embodiments, the fixed base structure 105 includes a deck section 106 that is positioned near the rear end 204 thereof and at (or adjacent to) the proximal end 201 of the inclinable access structure 110. The deck section 106 may have a substantially flat surface parallel to and facing away from the ground (e.g., facing upward). The surface of the deck section 106 is suitable for standing and walking, and may have a similar surface structure as that of the inclinable access structure 110 or may have a different surface structure than that of the inclinable access structure 110. For example, because the deck section 106 does not incline (e.g., remains flat), the deck section 106 may have a continuous, flat surface, optionally with ribs or grooves formed therein for additional traction, as opposed to stairs as in the inclinable access structure 110.

In addition, the elevated access system 100 includes a multi-position end breaching platform 125. The multi-position end breaching platform 125 may be pivotably connected to the distal end 202 of the inclinable access structure 110. The multi-position end breaching platform 125 has a surface 126 that, in a deployed configuration, faces away from and is parallel to the ground (e.g., is substantially flat). In the retracted position, the multi-position end breaching platform 125 lies on the inclinable access structure 110 to provide compact overall dimensions. The surface 126 is suitable for standing and walking and may have a similar surface structure as that of the inclinable access structure 110 or a different surface structure as that of the inclinable access structure 110. For example, when the inclinable access structure 110 is stairs, the surface 126 may also be stairs. But in another embodiment, when the inclinable access structure 110 is stairs, the surface 126 may be a flat (with or without ribs or grooves for traction) surface. Further, the deck section 106, the inclinable access structure 110, and the multi-position end breaching platform 125 provide a substantially continuous path (e.g., movement path) for one or more people and/or machines (e.g., drones, robots, etc.) to access an elevated location by walking or running from the deck section 106, up the inclinable access structure 110, onto the multi-position end breaching platform 125, and then into the elevated position. In various embodiments, the multi-position end breaching platform 125 may be configured to remain passively parallel to the ground during operation of the vehicle-mounted elevated access system 100. For example, the surface 126 may remain parallel to the ground regardless of the inclination angle of the inclinable access structure 110 to which it is connected.

The multi-position end breaching platform 125 may also be controlled to be inclined at an angle corresponding to the inclination angle of the inclinable access structure 110 to allow access to even higher points of interest. For example, in some embodiments, the multi-position end breaching platform 125 may be configured to be raised by actuators (e.g., secondary actuators) 301. In some embodiments, the actuators 301 may be electric actuators, but the present invention is not limited thereto. The actuators 301 are connected between the distal end 202 of the inclinable access structure 110 and the multi-position end breaching platform 125 (e.g., a proximal end of the multi-position end breaching platform 125 adjacent to the distal end 202 of the inclinable access structure 110). The actuators 301 can push the multi-position end breaching platform 125 upwardly to match (or substantially match) the angle of the inclinable access structure 110.

The elevated access system 100 may include handrails 130 mounted to the inclinable access structure 110 and handrails 131 mounted to the multi-position end breaching platform 125. The handrails 130 may be positioned along and pivotably mounted to the inclinable access structure 110, and the handrails 131 may be positioned along and pivotably mounted to the multi-position end breaching platform 125. In some embodiments, handrails 130 and handrails 131 may be configured to operate independently from each other. The handrails 130/131 may operate by gravity. For example, as the inclinable access structure 110 is deployed, the handrails 130/131 may fall backwards, thereby extending the handrails 130/131. In some embodiments, the handrails 130/131 may be pivotably mounted to the inclinable access structure 110 and the multi-position end breaching platform 125, respectively, and may have stops such that, when the pivot to the extended position is due to gravity, the stop pivoting at a desired angle due to the stops. In the illustrated embodiment, the handrails 131 and 130 may be connected to the inclinable access structure 110 via a deployment linkage 115 such that the motion of the inclinable access structure 110 passively (e.g. without additional actuation) deploys and stows the handrails 131 and 130 while rigidly maintaining their position (e.g., their stowed or deployed position).

In various embodiments, a control system (e.g., a controller) 135 may be housed in or on the vehicle and/or within the fixed base structure 105. The control system 135 is configured to control the operation of the vehicle-mounted elevated access system 100. For example, the control system 135 may control the movement of the actuators 140 and the movement of the actuators 301 to determine the configuration and overall height of the inclinable access structure 110.

A method of deploying (e.g., extending, raising, or inclining) an embodiment of the vehicle-mounted elevated access system 100 will be described in more detail hereinafter with reference to FIGS. 4-8.

Figure 4:
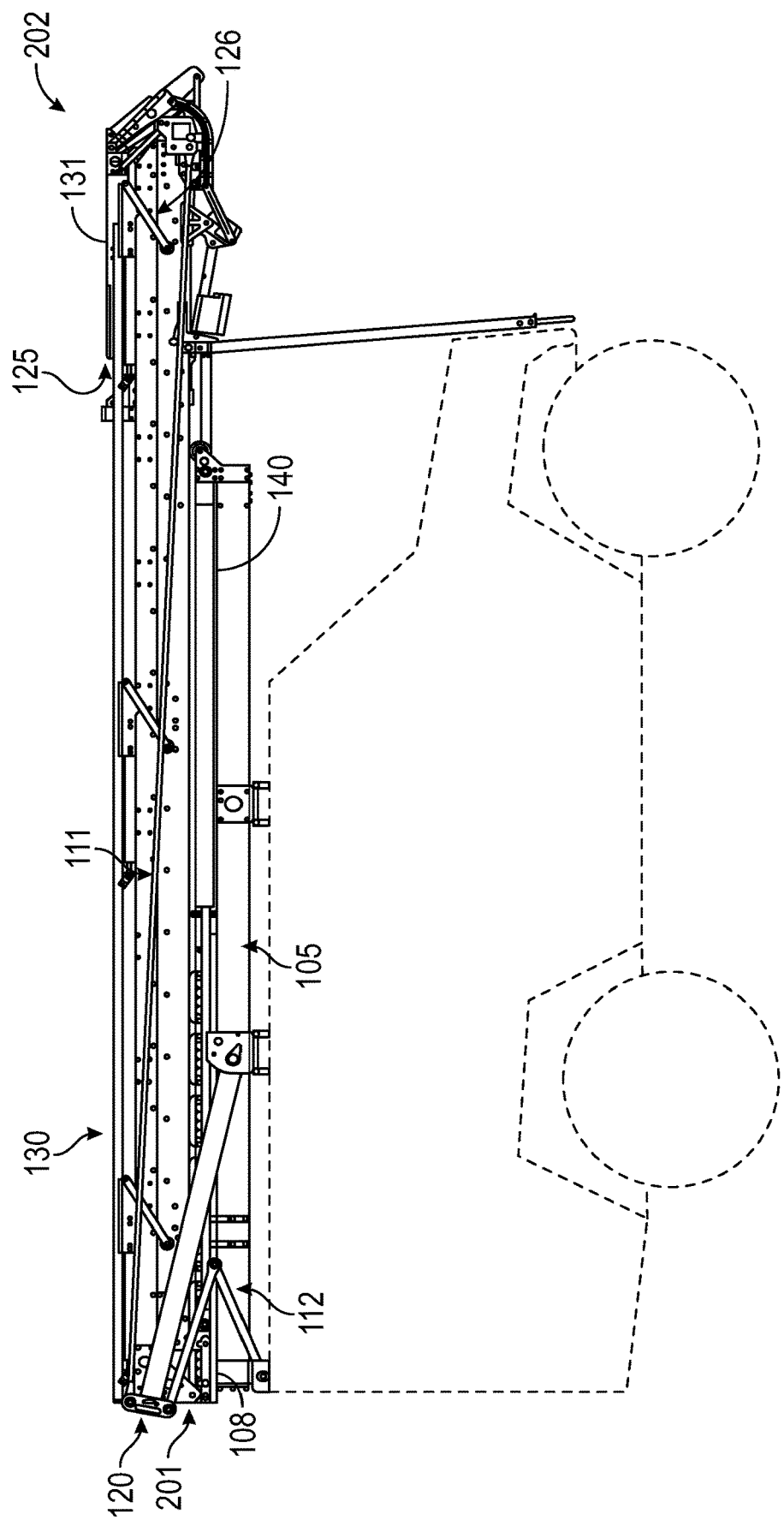
FIGS. 4-8 show steps of deploying the vehicle-mounted elevated access system from a stowed configuration according to an embodiment of the present invention.

Referring to FIG. 4, which shows the vehicle-mounted elevated access system 100 in the stowed (or retracted) configuration, the inclinable access structure 110 is positioned flat against the fixed base structure 105, and the multi-position end breaching platform 125 is folded against (e.g., is folded against a top surface of) the inclinable access structure 110. In this configuration, the handrails 130 and 131 are in a stowed configuration in which they are positioned flat against the fixed base structure 105, and the lifting masts 120 are in a stowed configuration in which they are pivoted downwardly near the fixed base structure 105.

Figure 5:
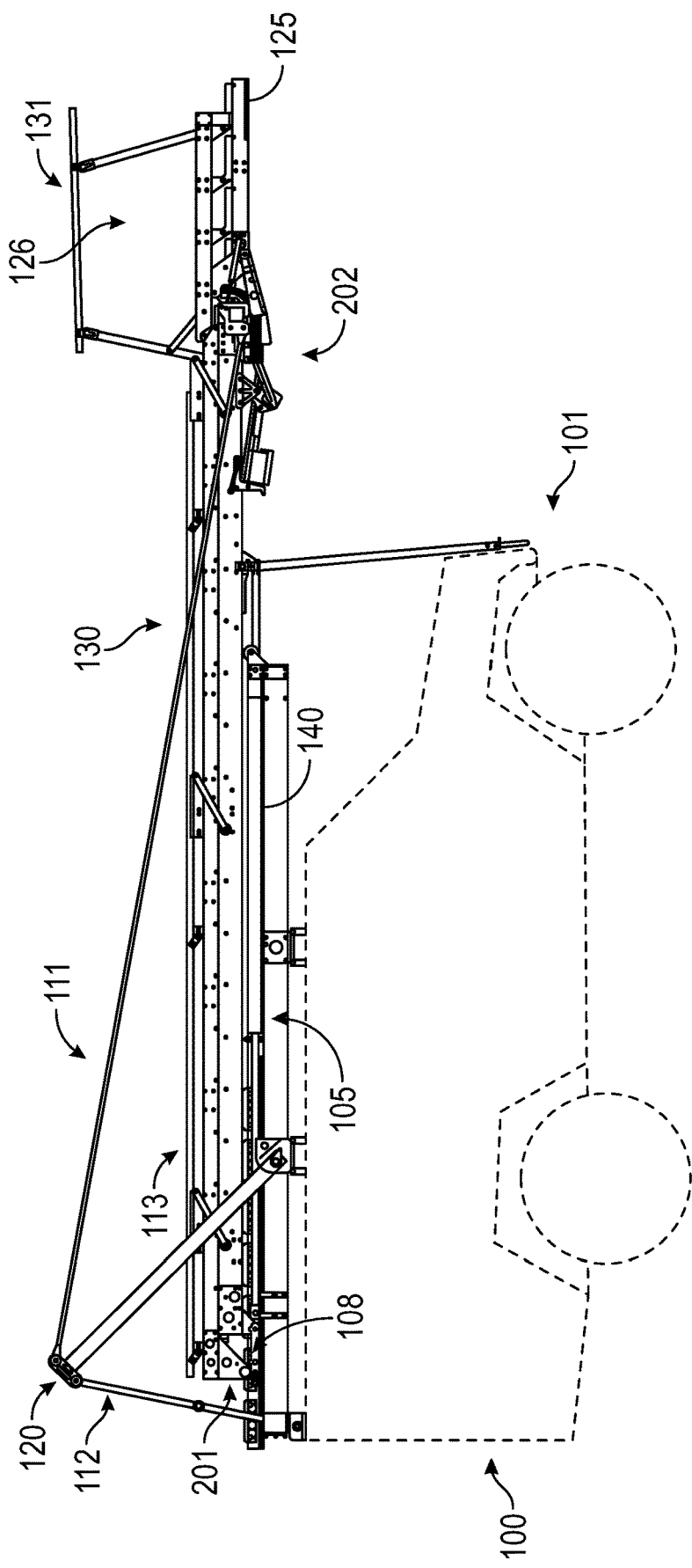

Referring to FIG. 5, in the deployed flat configuration, the inclinable access structure 110 remains flat against the fixed base structure 105, but the lifting masts 120 are shifted into their deployed position due to retraction (e.g., partial retraction) of the actuators 140, which pulls the tension elements 111 forward, which cause the movable hinge points 108 to move along the track channels 107, which causes the lifting masts 120 to move into a deployed configuration (or position). Additionally, as the movable hinge points 108 translate the inclinable access structure 110 forward, the multi-position end breaching platform 125 is shifted into its flat deployed position by way of forces applied through the deployment mechanism 302, and reacted by the fixed base structure 105, and host vehicle 101. The forward tension elements 111 and the rear tension elements 112 pivot relative to the fixed base structure 105 during the movement of the actuators 140 but do not bend or fold. In various embodiments, the lifting masts 120, the handrails 131, and the multi-position end breaching platform 125 may be deployed concurrently (or substantially simultaneously).

In the deployed flat configuration, the tops of the lifting masts 120 are raised above the fixed base structure 105. The inclinable access structure 110 is connected to the lifting masts 120 by the forward tension elements 111, and the lifting masts 120 are connected to the fixed base structure 105 by way of rear tension elements 112 and the pivotable connection 104. In the deployed flat configuration, the multi-position end breaching platform 125 is oriented in a flat, deployed position in which the multi-position end breaching platform 125 is folded out so that the surface 126 thereof faces upwardly and is parallel to the inclinable access structure 110. In various embodiments, the multi-position end breaching platform 125 may be configured to remain passively parallel to the ground in the flat deployed position. In this configuration, the handrails 131 of the multi-position end breaching platform 125 may be deployed automatically (e.g., may be deployed passively, without additional actuation) via a rigid linkage 303 (e.g., may be a multilink kinematic mechanism) while the handrails 130 of the inclinable access structure 110 remain flat against the fixed base structure 105.

Figure 6:
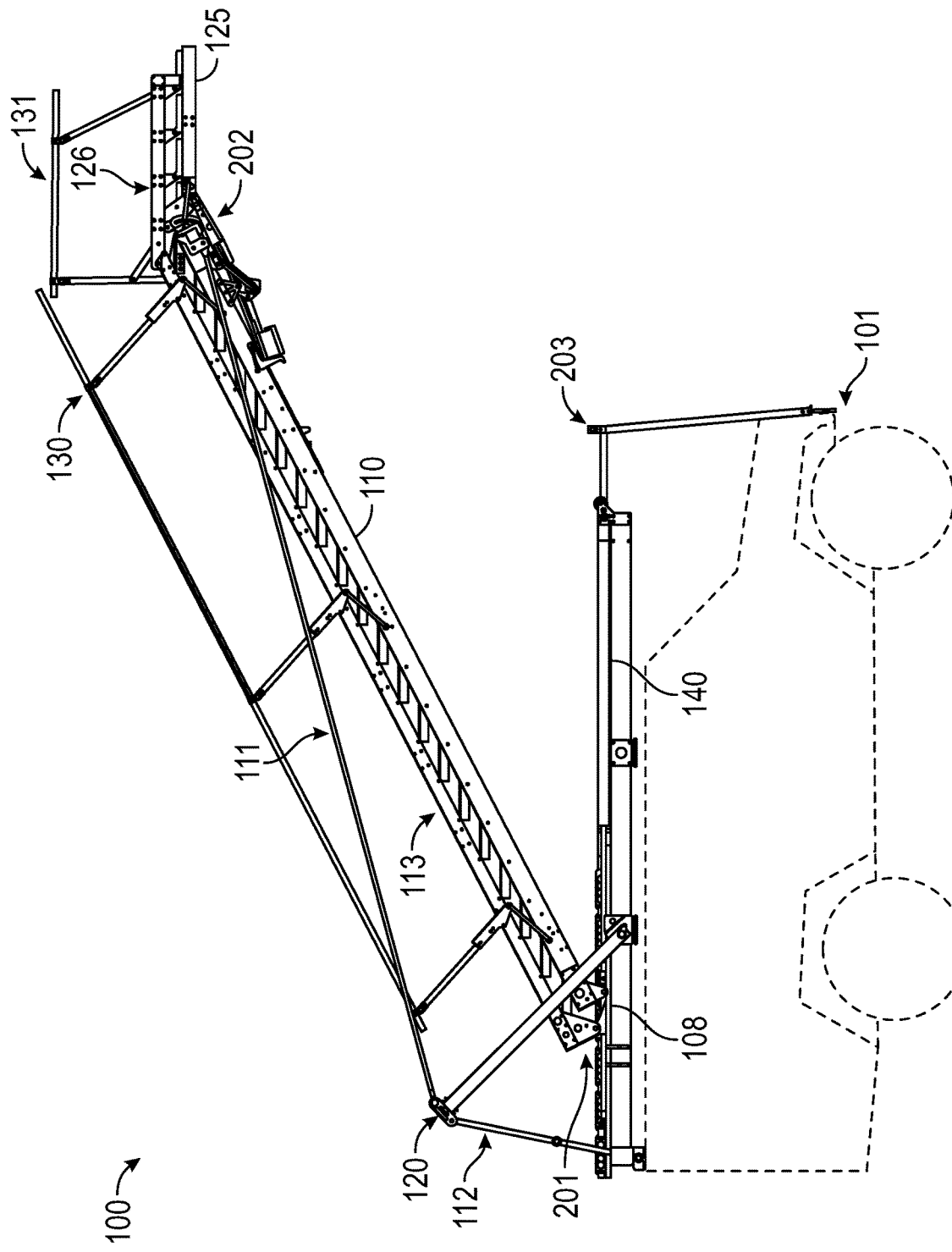

The elevated access system 100 shifts from the deployed flat configuration shown in FIG. 5 to the deployed low angle configuration shown in FIG. 6 by further movement of the actuators 140. In the deployed low angle configuration shown in FIG. 6, the distal end 202 of the inclinable access structure 110 is raised to a height above the fixed base structure 105. As described above, because the steps 113 of the inclinable access structure 110 are configured to remain passively parallel to the ground, they remain parallel to the ground in this configuration without external input. Similarly, the multi-position end breaching platform 125 is pivotably connected to the distal end 202 of the inclinable access structure 110 such that it remains passively parallel to the ground without external input. In various embodiments, the multi-position end breaching platform 125 may be configured to remain passively parallel to the ground during operation of the vehicle-mounted elevated access system 100. When the inclinable access structure 110 is moved to an angle above parallel, such as the low angle deployed configuration shown in FIG. 6, the handrails 130 may be extended (or deployed) via the motion of the deployment linkages 115 connected to the inclinable access structure 110 and to the proximal ends of the handrail uprights 116. Such linkages may be disconnected to allow handrails 130 to lay flat on the inclinable access structure 110 when desired. In the low angle deployed configuration, both the handrails 130 and 131 may be in the extended (or deployed) configuration (or position).

Figure 7:
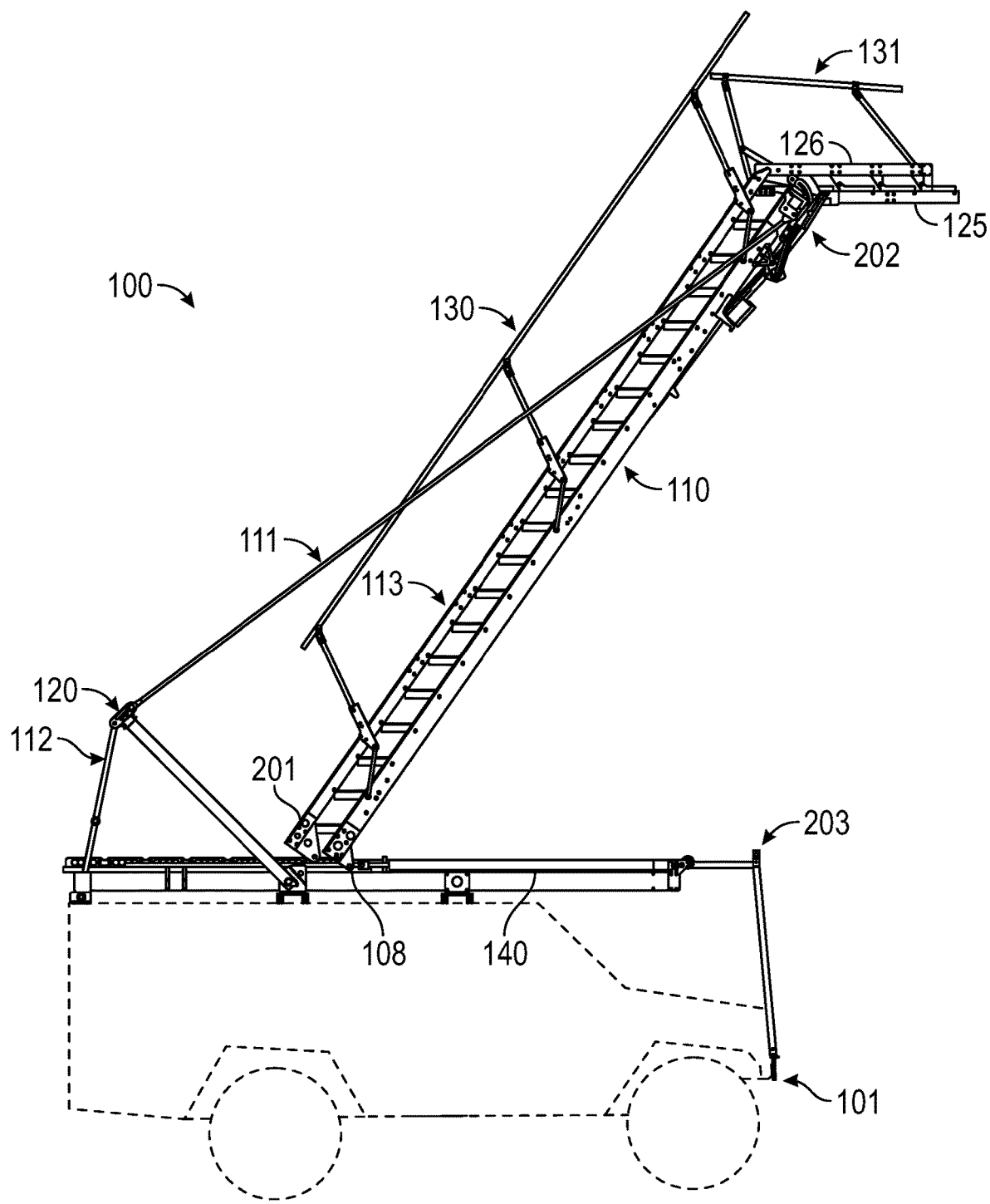

The elevated access system 100 shifts from the deployed low angle configuration shown in FIG. 6 to the deployed high angle configuration as shown in FIG. 7 by further movement of the actuators 140. Referring to FIG. 7, in the deployed high angle configuration, the distal end 202 of the inclinable access structure 110 is raised to a height greater than that reached in the deployed low angle configuration shown in FIG. 6. As in the other configurations, the steps 113 of the inclinable access structure 110 and the surface 126 of the multi-position end breaching platform 125 remain passively parallel to the ground. The handrails 130 remain substantially parallel to the inclinable access structure 110, and the handrails 131 remain substantially parallel to the multi-position end breaching platform 125.

Figure 8:
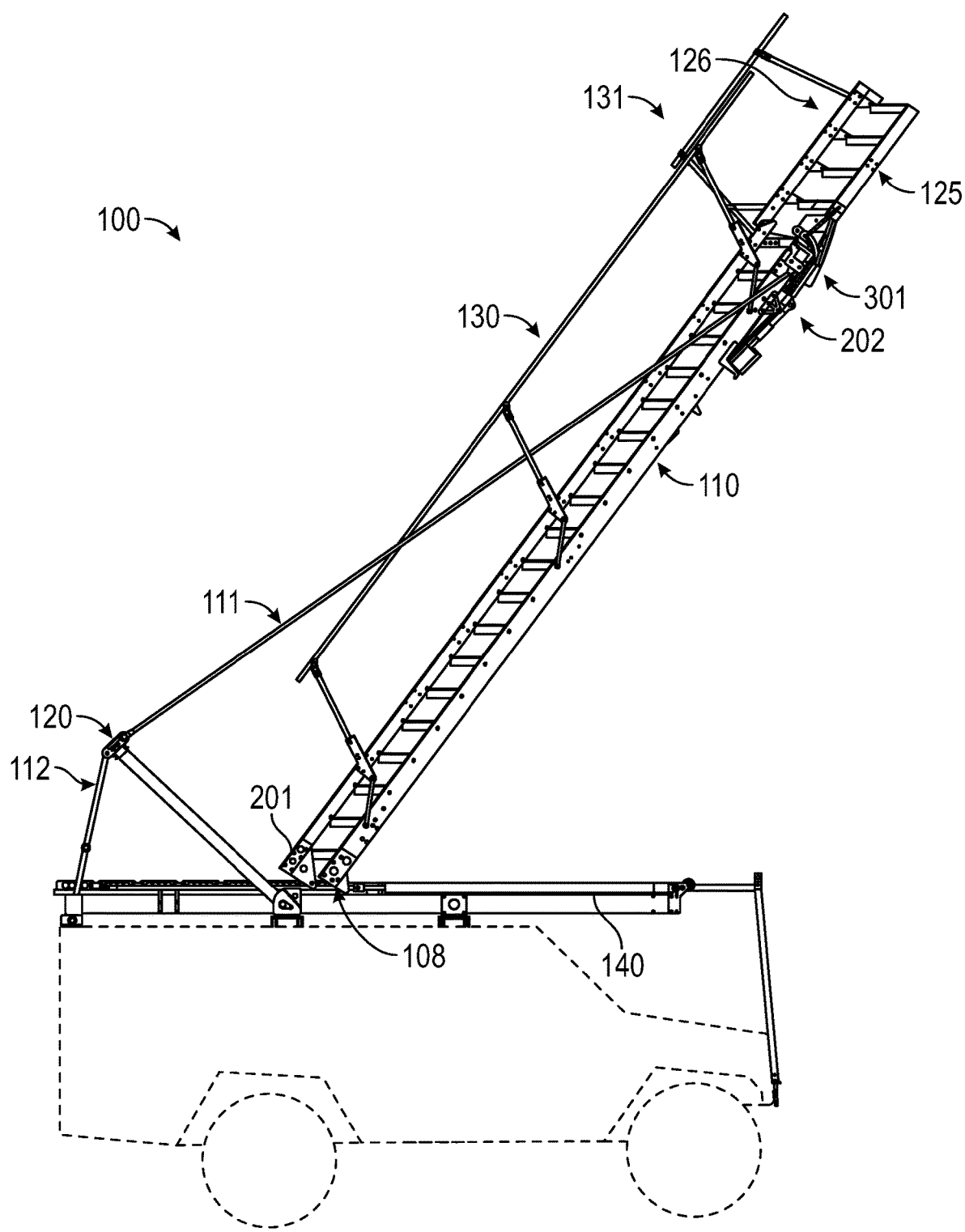

The elevated access system 100 shifts from the deployed high angle configuration shown in FIG. 7 to the deployed high angle configuration with the multi-position end breaching platform 125 deployed in a stairway configuration as shown in FIG. 8 by extension (e.g., further extension) of the actuators 301. Referring to FIG. 8, when the multi-position end breaching platform 125 is in the stairway configuration, the tread surface 126 of the multi-position end breaching platform 125 separates and rotates into a series of stairs which align as an extension of the inclinable access structure 110 and is not parallel to the ground as in the above-described configurations. The multi-position end breaching platform 125 is deployed into the stairway configuration by movement (e.g., extension) of the actuators 301.

Although the multi-position end breaching platform 125 is only shown as entering the stairway configuration when the inclinable access structure 110 is in its highest configuration, that is, the high angle configuration, the multi-position end breaching platform 125 may enter the stairway configuration regardless of the position (or configuration) of the inclinable access structure 110 as long as it is in at least the deployed flat configuration shown in FIG. 5 (e.g., as long as the multi-position end breaching platform 125 is folded out from the inclinable access structure 110).

Further, although the inclinable access structure 110 is shown as being deployed into certain configurations, the inclinable access structure 110 can be deployed to any height between the deployed flat configuration shown in FIG. 5 to the deployed high angle configuration shown in FIG. 8. Put another way, the inclination angle of the inclinable access structure 110 is not limited to the distinct angles shown in FIGS. 5-8 but may be raised to any desired height (e.g., to any desired angle) between the deployed flat configuration shown in FIG. 5 and the deployed high angle configuration shown in FIG. 8. Nor are the angles of the inclinable access structure 110 and the multi-position end breaching platform 125 shown in FIG. 8 intended to be limiting of the possible range of motion of these components.

In some embodiments, a user may be able to control the inclinable access structure 110 and/or the multi-position end breaching platform 125 to reach a desired height by using a controller. For example, a user may input or select a desired height for vehicle-mounted access system 100 (e.g., the distal end of the multi-position end breaching platform 125), and the vehicle-mounted elevated access system 100 may deploy itself to the desired height. For example, the controller 135 may have a look-up table of values comparing movement of the actuators 140 to the overall height of the elevated access system 100. And, in some embodiments, the controller 135 may store heights of various entry points, etc., such as the height of a particular aircraft door above the ground. In such an embodiment, a user may select which door of an aircraft the elevated access system 100 is desired to reach, and by using the software look-up table and stored information relating to the height of the selected aircraft door, the elevated access system 100 may deploy the inclinable access structure 110 and the multi-position end breaching platform 125 to substantially the correct height to reach the selected aircraft door.

Figure 9:
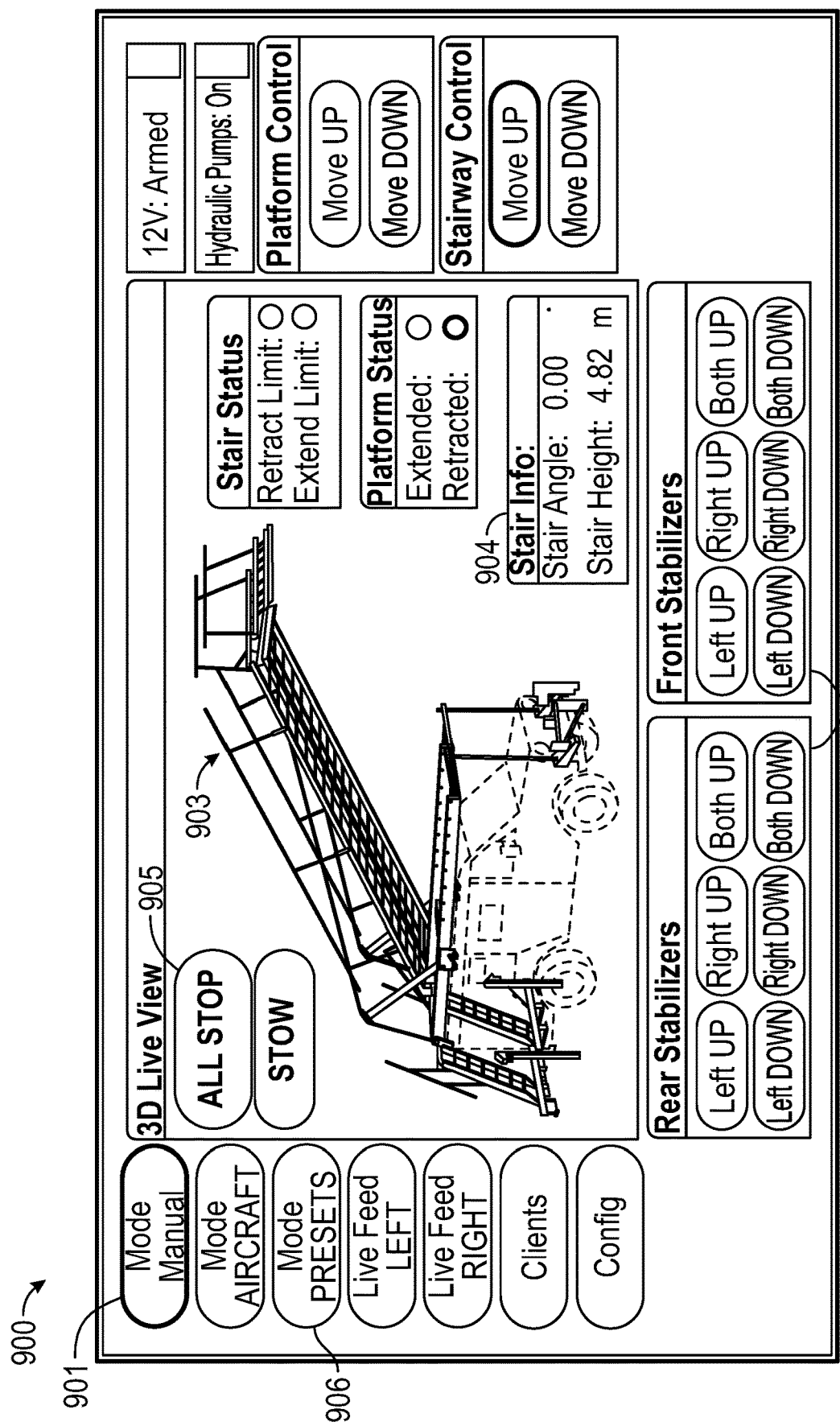
FIG. 9 shows a graphical user interface (GUI) for controlling the vehicle-mounted elevated access system in a manual mode according to an embodiment of the present invention.

FIG. 9 illustrates a graphical user interface 900 for communicating with the controller according to an embodiment of the present invention.

Referring to FIG. 9, the graphical user interface 900 communicates with the controller on the vehicle-mounted elevated access system 100 to control the operation of the system. The graphical user interface 900 may operate on a suitable device using touchscreen input methods, such as mobile devices including mobile phones, tablets, etc. The graphical user interface 900 is compatible with multiple touch enabled operating systems including, but not limited to: macOS, iOS, Android, Windows. The graphical user interface 900 may communicate with the controller of the vehicle-mounted elevated access system 100 via a cellular connection, a WiFi connection by using in-vehicle WiFi hotspot (e.g., a local-area WiFi network), or Bluetooth. Over the Air (OTA) updates are available for software running on device that have an internet connection. The graphical user interface 900 may incorporate programmed logic with feedback from sensors and switches to prevent mechanical interference between mechanisms, such that, for example the multi-position end breaching platform 125 does not extend unless the inclinable access structure 110 is raised to or above 1 degree). In some embodiments, the touchscreen controls are useable by operators in touch-enabled gloves.

In various embodiments, graphical user interface 900 can operate in different control modes, including, but not limited to, manual control mode, preset mode, aircraft mode, and video streaming mode. The manual control mode can be selected by pressing the MODE MANUAL button 901. When in manual control mode, individual touch sensitive actuation buttons 902, when held down, control the extension and retraction of various mechanisms and actuators. In some embodiments, the graphical user interface 900 may include an ARM button. In such an embodiment, to move the inclinable access structure 110 and/or the multi-position end breaching platform 125, the user may be to hold down the ARM button along with any actuation button 902 to execute the selected actuation command to prevent or reduce the occurrence of accidental control inputs. The manual control mode also displays a 3D responsive image 903 of the vehicle-mounted elevated access system 100 that highlights the subsystem (or component) being actuated. A stair info box 904 displays real time angle and height of the inclinable access structure 110 and the multi-position end breaching platform 125 by using on board sensors. A large ALL STOP button 905 can be pushed to immediately cut power to all systems, which will arrest the motion of the system and maintain its position for safety.

The preset mode can be selected by pressing the MODE PRESETS button 906. When in preset mode, the graphical user interface 900 displays a scrollable list of preset system heights from 3 meters (m) to 9 m in 0.25 m increments. The preset system heights correspond to the height of the overall distal end. While holding down the ARM button (when present), a user presses and release one of the preset height buttons, at which time the graphical user interface 900 will display a "deploying to preset" message and will begin to drive system to the preset height. If at any time, the user releases the ARM button during deployment to the preset height, the control logic will automatically halt all system motion. Once the desired height has been reached, as determined by on-board sensors, the controller will automatically halt all motion and maintain the position (or configuration) of the vehicle-mounted elevated access system 100. Any configuration (e.g., height) can be stored (e.g., permanently stored) in the controller for quick recall by pressing a SAVE CONFIGURATION button. The stored configuration may then be named by a user, such as "West Wing—$2^{nd}$ Store Balcony".

The video streaming mode can be selected by pressing the VIEW VIDEO STREAM button. When the VIEW VIDEO STREAM button is selected, the device wirelessly streams live high definition (HD) video from Ethernet cameras mounted to the vehicle-mounted elevated access system. During video streaming, a return arrow in corner of the screen allows user to return to the most recent control screen.

Figure 10:
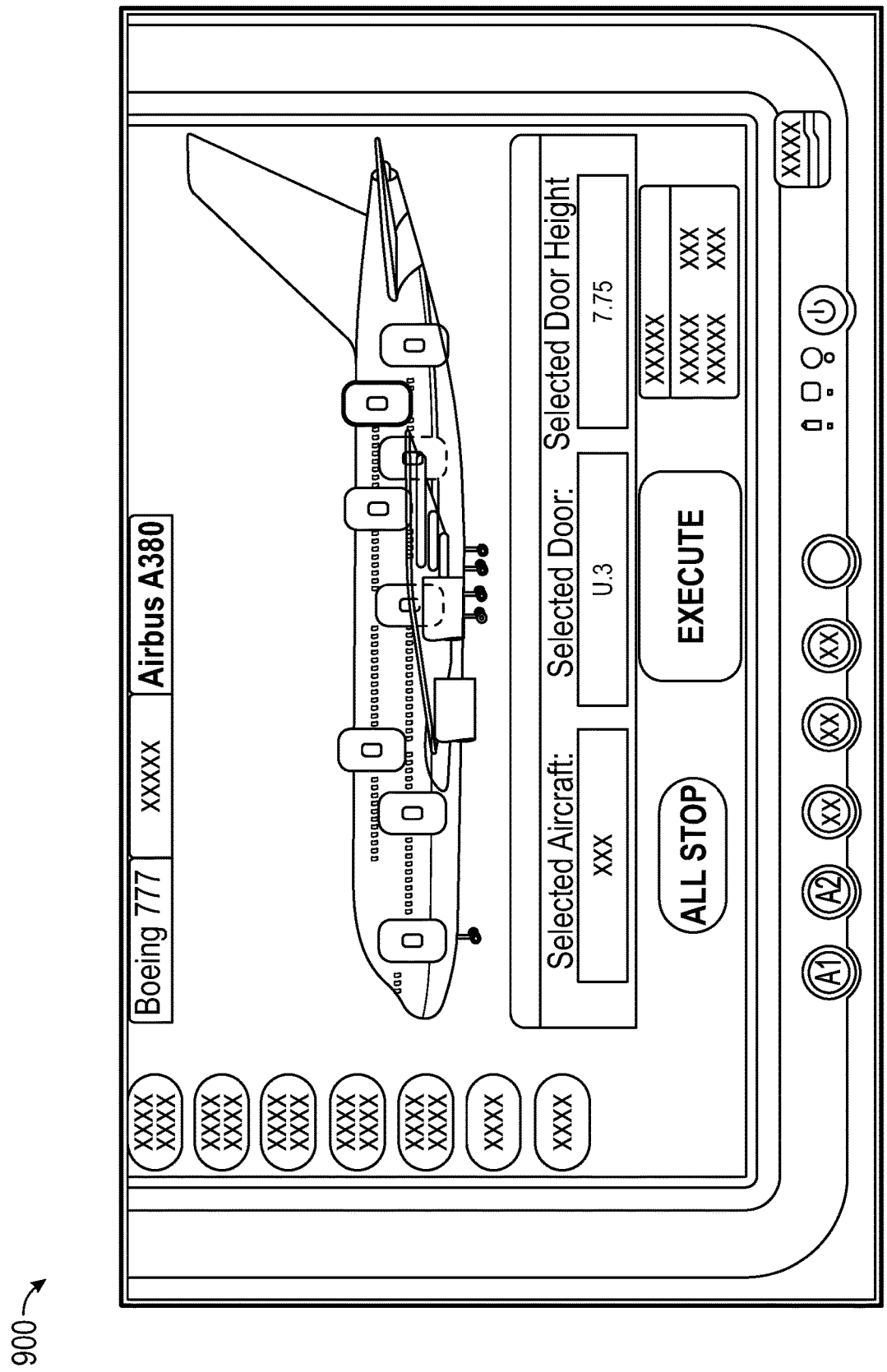
FIG. 10 shows the GUI shown in FIG. 9 in an aircraft mode according to an embodiment of the present invention.

FIG. 10 illustrates another screen of the graphical user interface (UI) 900 in an aircraft mode according to an embodiment of the present invention.

When in the aircraft mode, the graphical user interface 900 displays a drop down "Aircraft Selection Menu." The "Aircraft Selection Menu" provides a user with a list of commercial aircraft to choose from, such as the Airbus A380, the Boeing 777, the Boeing 747, etc. Upon selection of an aircraft, a side view of that aircraft (with identification label) is displayed on the screen with each fuselage door represented as an easily visible button. While holding down the ARM button (when present), a user presses and releases one of the fuselage door buttons, at which time the UI displays a "Deploying to Preset" message and begins to drive the vehicle-mounted elevated access system 100 into a configuration corresponding to the selected door preset. Fuselage door configuration settings may be pre-calibrated to aircraft manufacturer specifications. If at any time, the user releases the ARM button during deployment to preset, the control logic will automatically halt all system motion. Once a preset configuration has been reached, the corresponding fuselage door remains highlighted until a different configuration is selected. The user can select a desired height for the distal end of the inclinable access structure 110 and/or the multi-position end breaching platform 125 by selecting a window on the side view of the displayed aircraft. The height of the window corresponds to the height of the inclinable access structure 110 and/or the multi-position end breaching platform 125.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

The same reference numerals designate the same elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112(a) and 35 U.S.C. § 132(a).

Although example embodiments of the vehicle-mounted elevated access system have been described and illustrated herein, many modifications and variations within those embodiments will be apparent to those skilled in the art. Accordingly, it is to be understood that the vehicle-mounted elevated access system according to the present invention may be embodied in forms other than as described herein without departing from the spirit and scope of the present invention. The present invention is defined by the following claims and equivalents thereof.

What is claimed is:

1. A vehicle-mounted access system comprising:
   a fixed base structure comprising a plurality of track channels;
   a plurality of movable hinge carriages respectively on and configured to move along the plurality of track channels;
   an inclinable access structure having a proximal end and a distal end, the proximal end of the inclinable access structure being pivotably connected to the plurality of movable hinge carriages;
   a lifting mast having a proximal end and a distal end, the distal end of the lifting mast being connected to the distal end of the inclinable access structure by forward tension elements and being connected to the fixed base structure by rear tension elements, the proximal end of the lifting mast being pivotably connected to the fixed base structure; and
   an actuator connected between the movable hinge carriages and the fixed base structure, the actuator being configured to move the movable hinge carriages to raise the distal end of the inclinable access structure via the forward tension elements, the lifting mast, and the rear tension elements.

2. The vehicle-mounted access system of claim 1, further comprising an inclinable access handrail positioned along to and pivotably attached to the inclinable access structure.

3. The vehicle-mounted access system of claim 2, wherein the inclinable access handrail is configured to extend into a deployed position by a plurality of linkages.

4. The vehicle-mounted access system of claim 1, further comprising a multi-position end breaching platform that is pivotably connected to the distal end of the inclinable access structure.

5. The vehicle-mounted access system of claim 4, further comprising a platform handrail positioned along and pivotably attached to the multi-position end breaching platform.

6. The vehicle-mounted access system of claim 5, wherein the platform handrail is configured to extend into a deployed position by an action of a multilink kinematic mechanism.

7. The vehicle-mounted access system of claim 4, further comprising a plurality of secondary actuators connected between the distal end of the inclinable access structure and the multi-position end breaching platform.

8. The vehicle-mounted access system of claim 7, wherein the secondary actuators are configured to extend to pivot the multi-position end breaching platform relative to the inclined access structure and to transition a surface of the multi-position end breaching platform into a series of stairs.

9. The vehicle-mounted access system of claim 1, wherein the inclinable access structure further comprises a ramp.

10. The vehicle-mounted access system of claim 1, wherein the inclinable access structure further comprises a plurality of stairs.

11. The vehicle-mounted access system of claim 10, wherein the plurality of stairs are configured to remain passively parallel to the ground.

12. The vehicle-mounted access system of claim 1, further comprising a controller configured to control movement of the actuator.

13. The vehicle-mounted access system of claim 12, wherein the controller is operated by a touchscreen user interface comprising:
a manual mode;
a preset mode;
a video streaming mode; and
an aircraft mode.

14. The vehicle-mounted access system of claim 13, wherein the preset mode is configured to allow a selection of pre-programmed heights of the distal end of the inclinable access structure.

15. The vehicle-mounted access system of claim 13, wherein, in the aircraft mode, the touchscreen user interface displays an aircraft,
wherein, in the aircraft mode, the controller is configured to allow for a selection of a pre-programmed height of the distal end of the inclinable access structure by selecting a window on the displayed aircraft.

16. The vehicle-mounted access system of claim 1, wherein the actuator is configured to pull the movable hinge carriages toward the actuator to raise the distal end of the inclinable access structure.

17. A method for deploying the vehicle-mounted access system according to claim 1 by using a touchscreen user interface, the method comprising:
displaying, by the touchscreen user interface, an image of an aircraft;
transmitting, by the touchscreen user interface, a preprogrammed height selected by a user by selecting a window on the image of the aircraft to a controller of the vehicle-mounted access system; and
raising, by the controller, a distal end of an inclinable access structure connected to the vehicle-mounted access system to the preprogrammed height.

* * * * *

(12) INTER PARTES REVIEW CERTIFICATE (3969th)

United States Patent
Clemente

(10) Number: US 11,174,677 K1
(45) Certificate Issued: May 7, 2025

(54) VEHICLE-MOUNTED ELEVATED ACCESS SYSTEM

(71) Applicant: Joshua Clemente, Philadelphia, PA (US)

(72) Inventor: Joshua Clemente, Philadelphia, PA (US)

(73) Assignee: Joshua Clemente

Trial Number:

IPR2023-01285 filed Aug. 7, 2023

Inter Partes Review Certificate for:

Patent No.: 11,174,677
Issued: Nov. 16, 2021
Appl. No.: 16/688,884
Filed: Nov. 19, 2019

The results of IPR2023-01285 are reflected in this inter partes review certificate under 35 U.S.C. 318(b).

INTER PARTES REVIEW CERTIFICATE
U.S. Patent 11,174,677 K1
Trial No. IPR2023-01285
Certificate Issued May 7, 2025

AS A RESULT OF THE INTER PARTES REVIEW PROCEEDING, IT HAS BEEN DETERMINED THAT:

Claim 9 is found patentable.

Claims 1-8 and 10-17 are cancelled.

\* \* \* \* \*